(12) United States Patent
Heguri et al.

(10) Patent No.: US 6,485,825 B1
(45) Date of Patent: Nov. 26, 2002

(54) PRESSURE-SENSITIVE ADHESIVE TAPE OR SHEET AND PROCESS FOR PRODUCING THE SAME

(75) Inventors: Masahiko Heguri, Amagasaki (JP); Yoshiyuki Miyake, Amagasaki (JP); Hiroshi Murayama, Amagasaki (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 09/673,239

(22) PCT Filed: Feb. 25, 2000

(86) PCT No.: PCT/JP00/01086

§ 371 (c)(1),
(2), (4) Date: Oct. 23, 2000

(87) PCT Pub. No.: WO00/55273

PCT Pub. Date: Sep. 21, 2000

(30) Foreign Application Priority Data

Mar. 18, 1999 (JP) ............................................. 11-073873

(51) Int. Cl.⁷ ................................................. B32B 7/12
(52) U.S. Cl. ........................ 428/343; 428/332; 428/353; 428/354
(58) Field of Search ................................ 428/332, 343, 428/353, 354; 528/44, 86, 205, 211, 219, 367, 272

(56) References Cited

U.S. PATENT DOCUMENTS 5,354,397 A * 10/1994 Miyake et al. ............... 156/242
5,529,655 A * 6/1996 Bravet et al. ............. 156/244.11
6,133,395 A * 10/2000 Miyata et al. ............. 252/182.14
6,218,006 B1 * 4/2001 Tokunaga et al. ....... 428/355 AC

FOREIGN PATENT DOCUMENTS

| EP | 0197460 A2 | * | 10/1986 | ......... C08F/220/28 |
| JP | 407018104 A | * | 1/1995 | ............... C08J/7/04 |
| JP | 408169970 A | * | 7/1996 | ............... C08J/7/04 |

* cited by examiner

Primary Examiner—James J. Seidleck
Assistant Examiner—Travis B Ribar
(74) Attorney, Agent, or Firm—Townsend & Banta

(57) ABSTRACT

The present invention is a pressure-sensitive adhesive tape or sheet prepared by laminating a pressure-sensitive adhesive layer onto one side of an urethane resin layer consisting of 100 weight parts of a polyol component and A weight parts of a polyisocyanate component with a distance between cross-links (weight average molecular weight/number of isocyanate groups) of 220–570, wherein the aforementioned A is represented by the following equation $$A = 100aX/Y$$

(in this equation, a is a constant 0.067–0.135, X is the hydroxide value of the aforementioned polyol component, and Y is the weight percent concentration of isocyanate groups in the polyisocyanate component), and, at 5° C. and 35° C., the strength at a 2% elongation is 0.40–2.20 Kg/15 mm-width and the breaking elongation is 50–300%.

16 Claims, No Drawings

PRESSURE-SENSITIVE ADHESIVE TAPE OR SHEET AND PROCESS FOR PRODUCING THE SAME

FIELD OF THE INVENTION

The present invention is related to a pressure-sensitive adhesive tape or sheet which has superior conformability onto a substrate, easy-tear properties, and coloring properties.

BACKGROUND OF THE INVENTION

So called "vinyl" tape, which is prepared by laminating a pressure-sensitive adhesive layer on one side of a soft vinyl chloride resin base material, is superior in terms of flexibility, conformability onto a substrate, easy-tear properties, electric insulation, etc., and can easily be colored and weather-proofed as necessary, and therefore is widely used in applications such as electric insulation tapes, anti-corrosion tapes, sealing tapes, marking sheets, etc.

Of these, marking sheets are widely used in sign boards, advertisement boards, shutters, and advertising stickers used on windows and such; ornamental stripe stickers used on automobiles, motor bikes, motor boats, snowmobiles, etc.; and display stickers used on traffic signs, directory boards, etc. Since conformability onto unevenness and curved surfaces of a substrate and lack of shrinking over time are required, the base material is prepared by adding a plasticizer, pigment and such to vinyl chloride resin, followed by molding with typically the calender method, and with the cast method for marking sheets and such which require superior quality in terms of weather resistance and strength (Japanese examined patent publication Tokko Hei 5-88862, for example).

However, since vinyl chloride resin contains chlorine, dioxine is produced when it is incinerated after use, resulting in environmental health problems. Therefore, a pressure-sensitive adhesive tape or sheet which uses resin containing no chlorine as the base material and yet possesses the same qualities as "vinyl" tapes is desired.

For example, Japanese unexamined patent publication Tokkai Hei 3-45672 discloses a marking film which uses polyurethane film as the base material. However, since the isocyanate component used in the aforementioned polyurethane film is diisocyanate with a short distance between isocyanate groups, such as tolylene diisocyanate, diphenylmethane diisocyanate, xylylene diisocyanate, and hexamethylene diisocyanate, the flexibility was insufficient and the conformability onto unevenness and curved surfaces of a substrate was also insufficient.

Tokkai Hei 8-20750 discloses a marking film whose base material is a polypropylene-based resin with a weight average molecular weight of 80,000–500,000 for which, based on the cross fractionation method, the eluted amount for 0° C. or higher and 10° C. or lower is 45–80 wt % of the total resin amount, the eluted amount for temperatures higher than 10° C. and 70° C. or lower is 5–35 wt % of the total resin amount, the eluted amount for temperatures higher than 70° C. and 95° C. or lower is 1–30 wt % of the total resin amount, and the eluted amount for temperatures higher than 95° C. and 125° C. or lower is 3–35 wt % of the total resin amount. This polypropylene-based resin is too soft, does not provide glossy film, and the obtained film has the shortcoming of being difficult to cut. Also, its weather resistance is low; it can be used for only two years even when a stabilizer is added.

DISCLOSURE OF THE INVENTION

In view of the aforementioned shortcomings, the objective of the present invention is to provide a pressure-sensitive adhesive tape or sheet which is flexible, superior in terms of the conformability onto a substrate, and superior in easy-tear properties, as well as a method for manufacturing such tape or sheet.

Another objective is to provide a pressure-sensitive adhesive tape or sheet which is superior in terms of coloring properties, weather resistance and such, and can be used preferably as marking tapes or sheets, as well as a method for manufacturing such tape or sheet.

The first of the present invention is a pressure-sensitive adhesive tape or sheet prepared by laminating a pressure-sensitive adhesive layer onto one side of an urethane resin layer consisting of 100 weight parts of a polyol. component and A weight parts of a polyisocyanate component with a distance between cross-links (weight average molecular weight/number of isocyanate groups) of 220–570, wherein the aforementioned A is represented by the following equation $$A=100aX/Y$$

(in this equation, a is a constant 0.067–0.135, X is the hydroxide value of the aforementioned polyol component, and Y is the weight percent concentration of isocyanate groups in the polyisocyanate component), and, at 5° C. and 35° C., the strength at a 2% elongation is 0.40–2.20 Kg/15 mm-width and the breaking elongation is 50–300%.

The second of the present invention is a pressure-sensitive adhesive tape or sheet prepared by laminating one after another a urethane resin layer consisting of 100 weight parts of a polyol component and A weight parts of a polyisocyanate component with a distance between cross-links (weight average molecular weight/number of isocyanate groups) of 220–570, an olefin-based resin layer, and a pressure-sensitive adhesive layer, wherein the aforementioned A is represented by the following equation $$A=100aX/Y$$

(in this equation, a is a constant. 0.067–0.135, X is the hydroxide value of the aforementioned polyol component, and Y is the weight percent concentration of isocyanate groups in the polyisocyanate component), and, at 5° C. and 35° C., the strength at a 2% elongation is 0.40–2.20 Kg/15 mm-width and the breaking elongation is 50–300%.

The third of the present invention is a method of manufacturing the pressure-sensitive adhesive tape or sheet of the first of the present invention which comprises a process in which the first lamination is obtained by laminating a pressure-sensitive adhesive layer onto one side of the first release film, a process in which the second lamination is obtained by applying a reactive resin composition consisting of 100 weight parts of a polyol component and A weight parts of a polyisocyanate component with a distance between cross-links (weight average molecular weight/ number of isocyanate groups) of 220–570 and solvent onto the second release film, followed by drying, thus forming a urethane resin layer with a cross-link ratio of 20–93% on one side of the second release film, and a process in which the first lamination and the second lamination are laminated together in such a way that the pressure-sensitive adhesive layer of the first lamination and the urethane resin layer of the second lamination contact each other and the reaction of the urethane resin is completed, wherein the aforementioned A is represented by the following equation $$A=100aX/Y$$

(in this equation, a is a constant 0.067–0.135, X is the hydroxide value of the aforementioned polyol component, and Y is the weight percent concentration of isocyanate groups in the polyisocyanate component.)

The fourth of the present invention is a method of manufacturing the pressure-sensitive adhesive tape or sheet of the second of the present invention which comprises a process in which the first a lamination is obtained by laminating a pressure-sensitive adhesive layer and then the first release film onto an olefin-based resin layer, a process in which the second lamination is obtained by applying a reactive resin composition consisting of 100 weight parts of a polyol component and A weight parts of a polyisocyanate component with a distance between cross-links (weight average molecular weight/number of isocyanate groups) of 220–570 and solvent onto the second release film, followed by drying, thus forming a urethane resin layer with a cross-link ratio of 20–93% on one side of the second release film, and a process in which the first lamination and the second lamination are laminated together in such a way that the olefin-based resin layer of the first lamination and the urethane resin layer of the second lamination contact each other and the reaction of the urethane resin is completed, wherein the aforementioned A is represented by the following equation $$A=100aX/Y$$

(in this equation, a is a constant 0.067–0.135, X is the hydroxide value of the aforementioned polyol component, and Y is the weight percent concentration of isocyanate groups in the polyisocyanate component.)

The fifth of the present invention is a method of manufacturing the pressure-sensitive adhesive tape or sheet of the second of the present invention which comprises a process in which the first lamination is obtained by laminating a pressure-sensitive adhesive layer and then the first release film onto an olefin-based resin layer, and a process in which a reactive resin composition consisting of 100 weight parts of a polyol component and A weight parts of a polyisocyanate component with a distance between cross-links (weight average molecular weight/number of isocyanate groups) of 220–570 and solvent is applied onto the aforementioned olefin-based resin layer, followed by drying, to form a urethane resin layer with a cross-link ratio of 20–93%, the second release film is then laminated onto said urethane resin layer, and the reaction of the urethane resin is completed, wherein the aforementioned A is represented by the following equation $$A=100aX/Y$$

(in this equation, a is a constant 0.067–0.135, X is the hydroxide value of the aforementioned polyol component, and Y is the weight percent concentration of isocyanate groups in the polyisocyanate component.)

THE BEST MODES OF THE EMBODIMENTS

The first of the present invention is a pressure-sensitive adhesive tape or sheet (hereafter referred to as "pressure-sensitive adhesive sheet") with specific mechanical properties prepared by laminating a pressure-sensitive adhesive layer onto one side of a urethane resin layer consisting of a polyol component and polyisocyanate component.

For the aforementioned polyol component, any polyol which has two or more hydroxyl groups and reacts with a polyisocyanate component to produce urethane resin, and has been conventionally used as the raw material of urethane resin, can be used. Examples include polyether polyol, polyester polyol, and acryl polyol. Acryl polyol is preferably used because of its superior paint film adhesion, chemical resistance, weather resistance, etc.

The preferable acryl polyol is a copolymer of alkyl (meth)acrylate and hydroxyl group-containing (meth)acrylates such as 2-hydroxyethyl (meth)acrylate, 2-hydroxypropyl (meth)acrylate, and 2-hydroxybutyl (meth)acrylate. For the aforementioned alkyl (meth)acrylate, alkyl (meth)acrylate which has an alkyl group having 12 or less carbon atoms is preferable. Examples include methyl (meth)acrylate, ethyl (meth)acrylate, n-butyl (meth)acrylate, isobutyl (meth)acrylate, 2-ethylhexyl (meth)acrylate, isooctyl (meth)acrylate, n-octyl (meth)acrylate, isononyl (meth)acrylate, and lauryl (meth)acrylate. They can be copolymerized independently, or in combinations of two or more.

Also, as necessary, monomers which can be copolymerized with the aforementioned hydroxyl group-containing (meth)acrylate and alkyl (meth)acrylate, including monomers such as styrene, vinyl acetate, vinyl propionate, (meth)acrylonitrile, and N-vinylpyrrolidone, as well as monomers with polar groups such as (meth)acrylic acid, maleic acid, fumaric acid, itaconic acid, and (meth)acrylamide, can also be copolymerized. Two or more copolymers can be used as necessary.

For the glass transition temperature (Tg) of the polyol component, if it is low then the urethane resin becomes soft and its mechanical strength decreases, and on the other hand, if it is high then the resin becomes brittle: A preferable range is 0–100° C., and a more preferable range is 30–80° C.

For the hydroxyl group value of the polyol if component, if it is low then the cross-link density of the obtained urethane resin becomes low, resulting in softening and a reduction in mechanical strength. On the other hand, if it is high the cross-link density becomes high and the urethane resin becomes brittle. Therefore, the preferable range is 20–150.

In the present invention, the hydroxyl group value is defined as the amount of potassium hydroxide (mg) required to neutralize the acetic acid which is bonded to the acetylated substance obtained from 1 g of the polyol component.

The weight average molecular weight of the polyol component is not limited in particular, as long as the component meets the aforementioned Tg and hydroxyl group value conditions and can be dissolved in the solvent. A general range is 1,000–500,000.

The aforementioned polyisocyanate component is a polyisocyanate which has two or more isocyanate groups in the molecule and reacts with the polyol component to form urethane resin. Polyisocyanate with a distance between cross-links of 220–570 is used for this. The distance between cross-links of polyisocyanate is defined as the weight average molecular weight of polyisocyanate divided by the number of the isocyanate (NCO) groups in the polyisocyanate. If two or more polyisocyanates are used, the weighted arithmetic average of the distances between cross-links of the polyisocyanates is used.

The larger the distance between cross-links of polyisocyanate, the wider the interval between cross-linked polyols, and the obtained urethane resin becomes softer. The smaller the distance between cross-links, the narrower the interval, and the obtained urethane resin becomes harder and more brittle. Therefore, a polyisocyanate with a distance between cross-links adjusted to 220–570 is used, and more preferably a polyisocyanate with a distance between cross-links of 250–550 is used.

Examples of polyisocyanates with a distance between cross-links of less than 220 include diisocyanates such as tolylene diisocyanate (TDI) 4,4-diphenylmethane diisocyanate (MDI), 1,5-naphthalene diisocyanate, hexamethylene diisocyanate (HDI), isophorone diisocyanate (IPDI), xylylene diisocyanate, and tetramethylxylene diisocyanate; the trimethylolpropane adduct of diisocyanate; the biuret of diisocyanate; the isocyanurate of diisocyanate, as well as condensated forms of these. Mixtures can be used as well. An example of a commercially available polyisocyanate with a distance between cross-links of less than 200 is Sumijule N3200 (trade name) from Sumitomo Bayer Urethane Co., Ltd. (mainly the biuret yielded from HDI, in which the solid content is 100 wt %, weight average molecular weight 670, number of isocyanate groups 3.7, distance between cross-links 181, and isocyanate group content 23.0 wt %).

Preferable examples of polyisocyanates with a distance between cross-links of 220–570 include the aforementioned trimethylolpropane-adduct of diisocyanate, a compound prepared by adding diisocyanate prepolymerized with polyester diol to trimethylolpropane, polyester diol- or polyester polyol-adducts of diisocyanate, the biuret of diisocyanate, and the isocyanurate of diisocyanate, as well as their condensated forms or mixtures.

Examples of commercially available polyisocyanates with a distance between cross-links of 220–570 are listed below.

For example, Sumijule HT (trade name, from Sumitomo Bayer Urethane Co., Ltd.) is an ethyl acetate solution of mainly an HDI adduct of trimethylolpropane (solid content 75 wt %, weight average molecular weight 1, 100, number of isocyanate groups 4.5, distance between cross-links 244, and isocyanate group content 13.0 wt %); Coronate HL (trade name, from Nippon Polyurethane Industries Co., Ltd.) is an ethyl acetate solution of mainly HDI adduct of trimethylolpropane (solid content 75 wt %, weight average molecular weight 850, number of isocyanate groups 3.4, distance between cross-links 250, and isocyanate group content 12.8 wt %); and Coronate HLS (trade name, from Nippon Polyurethane Industries Co., Ltd. is an ethyl acetate solution of mainly the cross-linked lacton ester of the aforementioned Coronate HL (solid content 75 wt %, weight average molecular weight 900, number of isocyanate groups 2.3, distance between cross-links 391, and isocyanate group content 10.0 wt %).

Additional examples include Desmodule E3265 (trade name, from Sumitomo Bayer Urethane Co., Ltd.) and Duranate E-402 (trade name, from Asahi Chemical Industry Co., Ltd.).

Examples of polyisocyanates with a distance between cross-links larger than 570 include Desmodule TPLS 2010/1 (trade name, from Sumitomo Bayer Urethane Co., Ltd.). This is polymerized HDI (solid content 100 wt %, weight average molecular weight 1,540, number of isocyanate groups 2.6, distance between cross-links 592, and isocyanate group content 10.4 wt %).

The urethane resin layer consists of 100 weight parts of the polyol component and A weight parts of the polyisocyanate component, where A is represented by the following equation.

$$A = 100aX/Y$$

In this equation, a is a constant 0.067–0.135, X is the hydroxide group value of the aforementioned polyol component, and Y is the weight percent concentration of isocyanate groups in the polyisocyanate component.

Urethane resin is formed by the reaction between the hydroxide groups of the polyol component and the isocyanate groups of the polyisocyanate component. If the isocyanate groups are few (if the amount of the added polyisocyanate component is small), then the cross-link density becomes low and there are many residual hydroxide groups, resulting in a soft and/or sticky urethane resin layer with insufficient mechanical strength. On the other hand, if there are many isocyanate groups (if the amount of the added polyisocyanate component is larger), the cross-link density becomes high, resulting in a reduction in deformation-conformability and excessive residual isocyanate groups, which contribute to changes in the mechanical strength over time. Therefore, the polyisocyanate component is added within the range mentioned above, and a preferable range of a is 0.075–0.125.

For the aforementioned pressure-sensitive adhesive, any prior art pressure-sensitive adhesive can be used, such as acryl-based pressure-sensitive adhesives, rubber-based pressure-sensitive adhesives, silicon-based pressure-sensitive adhesives, and urethane-based pressure-sensitive adhesives. When the pressure-sensitive adhesive sheet of the present invention is used as a marking sheet, since it will mostly be used outdoor, acryl-based pressure-sensitive adhesives, which have superior weather resistance, are preferable.

The form of the pressure-sensitive adhesive is not limited in particular; any prior art pressure-sensitive adhesive such as the solvent types, emulsion types, and hot-melt types can be used.

The pressure-sensitive adhesive sheet of the present invention is formed by laminating the pressure-sensitive adhesive layer on one side of the aforementioned urethane resin layer. For the thickness of urethane resin, if it is thin then the sheet becomes soft and loses stiffness, which makes handling difficult. If it is thick then the sheet becomes hard and the conformability into a substrate is reduced, which makes pasting difficult. Therefore, a preferable range is 30–120 micrometers, and a more preferable range is 40–100 micrometers.

The thickness of the pressure-sensitive adhesive layer should be such that the pressure-sensitive adhesive sheet can be pasted onto the substrate firmly enough. Generally, the thickness is 10–80 micrometers, and preferably 20–50 micrometers.

Therefore, the thickness of the pressure-sensitive adhesive sheet is preferably 40–200 micrometers, and more preferably 60–150 micrometers.

For the mechanical properties of the pressure-sensitive adhesive sheet of the present invention, at 5° C. and 35° C. the strength at a 2% elongation must be 0.40–2.20 Kg/15 mm-width and the breaking elongation must be 50–300%.

As a pressure-sensitive adhesive sheet is being pasted onto a substrate while the sheet is stretched a little so it can follow the substrate's shape, if the elongation strength is too weak, then the sheet stretches more than necessary and pasting becomes difficult. On the other hand, if the elongation strength is too strong, stretching the sheet becomes hard and thus making the sheet conform to the substrate's shape becomes hard; even if pasting can be done, peeling and separation tend to occur over time. Therefore, the strength at a 2% elongation must be 0.40–2.20 Kg/15 mm-width, preferably 0.50–2.10 Kg/15 mm-width, at normal temperatures, i.e. 5° C., and 35° C.

The method for measuring the strength at 2% elongation in the present invention is as follows. A 15 mm-wide pressure-sensitive adhesive sheet is held at 100 mm intervals and pulled at a pulling rate of 200 mm/minute. The stress at 2% elongation is measured.

For the breaking elongation, if it is small then breaking may result due to stretching during pasting or due to an impact; if it is too large, then cutting becomes difficult. Therefore, it has to be in the range of 50–300%, preferably 70–250%.

The method for measuring the breaking elongation in the present invention is as follows. A 15 mm-wide pressure-sensitive adhesive sheet is held at 100 mm intervals and pulled at a pulling rate of 200 mm/minute until it breaks. The length of elongation at the time of breaking is expressed as a ratio (%) compared with the original length of the pressure-sensitive adhesive sheet.

For the residual stress of the pressure-sensitive adhesive sheet, if a significant residual stress remains after stretched pasting, then the chance of separation and/or peeling over time increases. Therefore, the residual stress ratio ten minutes after 10% stretching should preferably be 60% or less.

The method for measuring the residual stress in the present invention is as follows. A 15 mm-wide pressure-sensitive adhesive sheet is held at 100 mm intervals, and pulled at a pulling rate of 200 mm/minute until the elongation is 10%, at which time the sheet is held as it is; ten minutes later the residual stress is measured and expressed as a ratio (%) in relation to the stress at the time of 10% elongation.

The second of the present invention is a pressure-sensitive adhesive sheet which consists of an olefin-based resin layer laminated between the urethane resin layer and the pressure-sensitive adhesive layer of the pressure-sensitive adhesive sheet of the first of the present invention.

For the aforementioned olefin-based resin, any conventional prior art olefin-based resin including a polyethylene resin, polypropylene resin, ethylene-propylene copolymer, copolymer of ethylene or propylene and α-olefin such as butene-1, pentene-1, hexene-1, heptene-1, octene-1,4-methyl-1-pentene, etc., ethylene-vinyl acetate copolymer, ethylene-acrylic acid copolymer, etc. can be used.

When the olefin-based resin layer is laminated, the mechanical properties of the pressure-sensitive adhesive sheet are mostly governed by the mechanical properties of the olefin-based resin layer. Since the mechanical properties of the pressure-sensitive adhesive sheet are as described above, the mechanical properties of the olefin-based resin layer should preferably be in the range described below.

That is, at 5° C. and 35° C., the strength at a 2% elongation is preferably 0.40–2.10 Kg/15 mm-width and the breaking elongation is preferably 100% or more. If a significant residual stress remains after stretched pasting, then the chance of separation and/or peeling over time increases. Therefore, the residual stress ratio ten minutes after 10% stretching should preferably be 60% or less.

The olefin-based resin to form the aforementioned olefin-based resin layer should preferably be a polypropylene-based resin with a weight average molecular weight of 80,000–500,000 for which, based on the cross fractionation method, the eluted amount at 0° C. is 30–70 wt % of the total resin amount, the eluted amount at temperatures higher than 0° C. and 70° C. or lower is 5–30 wt % of the total resin amount, and the eluted amount at temperatures higher than 70° C. is 20–60 wt % of the total resin amount (hereafter referred to as "polypropylene-based resin (A)")

For the weight average molecular weight, if it is small then the film strength decreases; if it is large then the flexibility decreases. Therefore, a preferable range is 80,000–500,000, and a more preferable range is 200,000–400,000. In the cross fractionation method, soft resin elutes at lower temperatures; the higher the temperature, the harder the eluted resin. Therefore, polypropylene-based resin which exhibits the aforementioned ranges of resin elution is preferable.

In the second of the present invention, the a cross fractionation method is as follows. The polypropylene-based resin to be measured is first dissolved into o-dichlorobenzene at 140° C. or the temperature at which it completely dissolves and then cooled at a constant rate. Thin resin layers are formed on an inert carrier surface, with layers with higher levels of crystallization and higher molecular weights deposited first. The temperature is then raised from 0° C. continuously or step-wise to elute the o-dichlorobenzene, and finally the concentration of the eluted resin is detected to measure the elution distribution of the resin by temperature.

In order to adjust the strength at a 2% elongation and the breaking strength of the aforementioned olefin-based resin layer, a polypropylene-based resin with a weight average molecular weight of 80,000–500,000 for which, based on the cross fractionation method, the eluted amount at 0° C. is 0–20 wt % of the total resin amount, the eluted amount at temperatures higher -than 0° C. and 70° C. or lower is 5–30 wt % of the total resin amount, and the eluted amount at temperatures higher than 70° C. is 70–90 wt % of the total resin amount (hereafter referred to as "polypropylene-based resin (B)") can be used in addition to polypropylene resin (A).

For polypropylene-based resin (B), the eluted amount at temperatures higher than 70° C. is 70–90 wt % of the total resin amount, which is high; i.e. it is a harder and mechanically stronger resin compared with polypropylene resin (A). Therefore, adding a larger amount of this resin results in an olefin-based resin with a higher strength at a 2% elongation, a smaller breaking elongation, and a higher residual stress ten minutes after 10% elongation. Preferable ranges are 100–30 wt % for polypropylene-based resin (A) and 0–70 wt % for polypropylene-based resin (B).

The pressure-sensitive adhesive sheet of the second of the present invention is the same as the pressure-sensitive adhesive sheet of the first of the present invention in terms of the configuration of the urethane resin layer and pressure-sensitive adhesive layer and physical properties such as the strength at a 2% elongation, the breaking elongation, and residual stress ratio.

The pressure-sensitive adhesive sheet of the second of the present invention comprises the aforementioned olefin-based resin layer onto one side of which a urethane resin layer is laminated and onto the other side of which a pressure-sensitive adhesive layer is laminated. If the olefin-based resin layer is thin then the stiffness is lost, resulting in difficult handling. If it is thick, then the sheet becomes hard and the conformability onto a substrate's shape deceases, resulting in difficult pasting. Therefore, a preferable range is 20–80 micrometers, and a more preferable range is 30–70 micrometers.

If the urethane resin layer is thin then the sheet becomes soft and loses its stiffness, resulting in difficult handling. If it is thick then the sheet becomes hard and the conformability onto a substrate's shape deceases, resulting in difficult pasting. Therefore, a preferable range is 5–50 micrometers, and a more preferable range is 10–30 micrometers. Therefore, the total thickness of the olefin-based resin layer and the urethane resin layer is preferably 25–130 micrometers, and more preferably 40–100 micrometers.

The thickness of the pressure-sensitive adhesive layer should be such that the pressure-sensitive adhesive sheet can be pasted onto a substrate with sufficient strength. A general range is 10–80 micrometers, and a preferable range is 20–50 micrometers.

Therefore, the thickness of the pressure-sensitive adhesive sheet is preferably 35–210 micrometers, and more preferably 50–150 micrometers.

Each layer of the pressure-sensitive-adhesive sheet of the present invention can be colored by adding a coloring agent. In particular, when the pressure-sensitive adhesive sheet is used as a marking tape or sheet (hereafter referred to as "marking sheet"), it must be colored. The coloring agent should preferably be added to the urethane resin layer.

For the aforementioned coloring agent, any coloring agent used for coloring resins, paints, etc. can be used. Examples include dyes such as azo dyes, anthraquinone dyes, indigoid dyes, phthalocyanine dyes, and carbonium ion dyes; inorganic pigments such as calcium carbonate, barium sulfate, zinc oxide, titanium oxide, chrome yellow, cadmium yellow, nickel titanium yellow, iron oxide red, cadmium red, molybdenum orange, Berlin blue, ultramarine blue, and carbon black; and organic pigments such as azo-based pigments, phthalocyanine-based pigments, metal complex salt-based pigments, triphenylmethane-based pigments, quinaclidone-based. pigments, and isoindolinone-based pigments. These coloring agents can be used independently or in combinations of two or more.

The amount of the aforementioned coloring agent to be added can be determined as necessary. Generally, it is preferable to add 0.1–70 weight parts for 100 weight parts of the urethane resin.

In addition, photo stabilizers, ultraviolet light absorbents, antioxidants, anti static additives, and antiblocking additives can be added to each layer as necessary.

Examples of the aforementioned photo stabilizers include poly[{6-(1,1,3,3-tetramethylbutyl) amino-1,3,5-triazine-2, 4-diyl} {(2,2,6,6-tetramethyl-4-piperidyl) imino} hexamethylene {(2,2,6,6-tetramethyl-4-piperidyl) imino}], succinic acid dimethyl-1-(2-hydroxyethyl)-4-hydroxy-2,2,6,6-tetr amethylpiperidine condensation polymer, and bis(1-octyloxy-2,2,6,6-tetramethyl-4-piperidyl) sebacate, which are hindered amine-based photo stabilizers. These photo stabilizers are commercially available from Ciba Specialty Chemicals K. K. with the trade names of Chimasorb 944, Tinuvin 622, and Tinuvin 123, respectively.

When adding the aforementioned photo stabilizers, it is preferable to use the so called NR type, whose amine groups have their hydrogen replaced and nitrogen bonded to an alkyl group or the main chain, and the so called NOR type, whose amine groups have their hydrogen replaced and nitrogen bonded to an alkyl group or the main chain through oxygen. Tinuvin 622 and Tinuvin 123 are preferably used.

Examples of the aforementioned ultraviolet light absorbents include benzotriazole-based ultraviolet light absorbents such as Tinuvin 327 and Tinuvin 328 (trade names) from Ciba Specialty Chemicals K.K., benzophenone-based ultraviolet light absorbents such as Chimasorb 81 (trade names-) from Ciba Specialty Chemicals K.K., and triazine-based ultraviolet light absorbents such as Tinuvin 900 (trade names) from Ciba Specialty Chemicals K.K.

Examples of the aforementioned antioxidants include hindered phenol-based antioxidants such as Irganox 1010 and Irganox 1076 (trade names) from Ciba Specialty Chemicals K.K. and phosphorus-based antioxidants such as Adekastab PEP8 (trade name) from Asahi Denka Kogyo K.K.

Examples of the aforementioned antistatic additives include surfactants such as anionic surfactants, cationic surfactants, ampholytic surfactants, and non-ionic surfactants, and electrically conductive powder such as carbon black.

Examples of the aforementioned antiblocking additives include inorganic fine powder such as silica and alumina, as well as glass beads and silicone fine particles.

The method for manufacturing the pressure-sensitive adhesive sheet of the first and second (claims) of the present invention is not limited in particular, and any prior art method can be used. It is preferable to use the methods of manufacturing the pressure-sensitive adhesive sheet of the third to fifth (claims) of the present invention as described below.

The third of the present invention is a method of manufacturing the pressure-sensitive adhesive sheet of the first of the present invention. This method comprises a process in which the first lamination is obtained by laminating a pressure-sensitive adhesive layer onto one side of the first release film, a process in which a reactive resin composition consisting of 100 weight parts of a polyol component and A weight parts of a polyisocyanate component and solvent is applied and dried onto the second release film to obtain the second lamination consisting of a urethane resin layer with a cross-link ratio of 20–93% on one side of the second release film, and a process in which the first lamination and the second lamination are laminated together in such a way that the pressure-sensitive adhesive layer of the first lamination and the urethane resin layer of the second lamination contact each other and the reaction of the urethane resin is completed.

The process for obtaining the aforementioned first lamination is a process of forming a pressure-sensitive adhesive layer on one side of the first release film. For the aforementioned first release film, any release film which is commonly used for release film for pressure-sensitive adhesive sheets, pressure-sensitive adhesive labels, etc. can be used. Examples include polyethylene laminated paper consisting of polyethylene laminated on a base paper material such as high quality paper and craft paper; clay coated paper consisting of clay laminated on a base paper material such as high quality paper and craft paper; glassine paper super calendered paper; and release film consisting of a silicone-based release agent, alkyl pendant-based release agent, fluoride-based release agent, etc. laminated on a base material such as a plastic film, e.g. a polyethylene terephthalate film, a oriented polypropylene film, or a polyethylene film.

Also, any prior art method can be used to form the pressure-sensitive adhesive layer. For example, a method in which the pressure-sensitive adhesive is applied onto the release film and then dried can be used for the solvent types or the emulsion types of pressure-sensitive adhesive; and a method in which the pressure-sensitive adhesive is melted and extruded onto the release film to form a lamination can be used for the hot melt type pressure-sensitive adhesives.

The process of obtaining the aforementioned second lamination is a process of applying a reactive resin composition onto the second release film, followed by drying, to form a urethane resin layer with a cross-link ratio of 20–93% on one side of the second second release film.

The aforementioned reactive resin composition consists of 100 weight parts of the polyol component and A weight parts of the polyisocyanate component. When so called "block type", in which isocyanate is blocked with alcohol or derivatives such as phenol and cyclohexane oxime, is not used, the reaction between the polyol component and the polyisocyanate component proceeds quickly after they are mixed. Therefore, it is preferable to prepare the polyol solution and polyol solution separately, mix them to obtain the reactive resin composition, and then apply it onto the second second release film, followed by drying.

For the aforementioned solvent, any solvent can be used which dissolves the polyol component and the polyisocyanate component. Examples include ethyl acetate, toluene, xylene, butyl acetate, isobutyl acetate, and methylisobutylketone. Mixed solvent can also be used. Commercially available products include Sorbesso (trade name: from Exxon Chemical Ltd.).

The concentration of the polyol solution can be chosen as appropriate. 25–100% is preferable. However, since the polyol component has a high molecular weight (a low molecular weight would result in reduced weather resistance of the base material), a high concentration would mean a high viscosity and difficulty in mixing and applying. Therefore, a solid content of 25–100% is preferable.

If a coloring agent, photo stabilizer, ultraviolet light absorbent, antioxidant, etc. are to be added, it is preferable to add them to the polyol solution and dissolve or disperse them before mixing.

Catalysts which are commonly used when manufacturing urethane resins can be used to adjust the reaction rate between the polyol component and the polyisocyanate component. Examples of such catalysts include amine-based catalysts such as triethylamine, triethylenediamine, and dimethylamino ethanol, tin-based catalysts such as dibutyl tin laurate and dioctyl tin dilaurate, zinc-based catalysts, and lead-based catalysts.

The amount of the catalyst to be added can be chosen as necessary. Generally, 0.05–1.0 weight parts is used for 100 weight parts of the total amount of the polyol component and the polyisocyanate component.

Cross-linking of the reactive resin composition applied onto the second release film takes some time. Therefore, a preferable procedure is as follows: in the beginning, the composition is dried at a temperature lower than its boiling point with plenty of air flow so that the solvent does not boil and bubble; after the solvent is evaporated to a certain extent, the composition is then heated to a temperature higher than the boiling point to accelerate the cross-linking process and reduce the amount of the residual solvent.

The reaction rate of the reactive resin composition slows down as the reaction proceeds. Therefore, when the urethane resin layer with a cross-link ratio of 20–93% is formed on one side of the second release film, the first lamination and the second lamination are laminated together such that the pressure-sensitive adhesive layer of the first lamination and the urethane resin layer of the second lamination contact each other to obtain a four-layer lamination consisting of the first release film, the pressure-sensitive adhesive layer, the urethane resin layer and the second release film laminated together, and then the urethane resin reaction is completed. To complete the urethane resin reaction, curing at 10–60° C. should be carried out for 1–10 days.

The aforementioned cross-link ratio is defined as follows. The urethane resin is fed into a shaker, swollen and dissolved in ethyl acetate at 23° C. for 24 hours. After filtering with a 200-mesh metal screen, the ratio of the residue on the screen and the original urethane resin (in wt % unit) is defined as the cross-link ratio.

As described above, the reaction rate of the reactive resin composition slows down as the reaction proceeds. Therefore, a large amount of heat and a large amount of time are required to complete the reaction of the reactive resin composition continuously during the manufacturing process, resulting in poor productivity. However, the aforementioned process allows for productive manufacturing.

Selection of the aforementioned second release film is not limited in particular, and the release film used for the aforementioned first release film, as described above, can be used. Since the physical adhesiveness of the urethane resin (reactive resin composition) is lower than that of the pressure-sensitive adhesive, films that do not react with the isocyanate groups of the urethane resin layer (reactive resin composition) and have a low polarity can be used; examples include plastic films such as polypropylene film, polyethylene terephthalate film, and polyethylene film, as well as their drawn films.

The aforementioned second release film is so-called release film, and it is peeled off before or after pasting the pressure-sensitive adhesive sheet onto a substrate. If the adhesiveness between the urethane resin layer after completion of the reaction and the second release film is weaker, separation occurs between the urethane resin layer and the second release film when the aforementioned four-layer lamination is transported, wound up for curing and storage, or treated for secondary processing, which results in poor appearance of the urethane resin layer. On the other hand, if the adhesive is strong, then peeling off the second release film is harder, and the second release film may break, and/or peels discontinuously to leave step marks on the urethane resin layer, resulting in poor appearance.

Therefore, the second release film should preferably be release film which, after completion of the urethane resin reaction, has a 180-degree peeling strength of 5–200 g/50 mm-width as measured at a peeling rate of 300 mm/minute. "After completion of the urethane resin reaction" means immediately following 24-hour curing at 40° C. after the four-layered lamination is obtained.

The urethane resin becomes the surface layer when the obtained pressure-sensitive adhesive sheet is pasted onto a substrate. If the pressure-sensitive adhesive sheet is used as a marking sheet, a designed external appearance may be required. In the aforementioned manufacturing method, the urethane resin is applied and dried onto the second release film as the reactive resin. composition, and the second release film is peeled after completion of the reaction of the urethane resin; therefore, the surface configuration of the second release film is transcribed onto the urethane resin layer. Because of this, it is preferable to use smooth release film when the surface of the urethane resin layer is required to be smooth, and to use release film with treated with a roughing process such as a matting process, roll process, or sandblast process when the surface of the urethane resin layer is required to be matted.

The fourth of the present invention is a method of manufacturing the pressure-sensitive adhesive sheet of the second of the present invention. This method comprises a process in which the first lamination is obtained by laminating a pressure-sensitive adhesive layer and then the first release film onto one side of the olefin-based resin layer, a process in which a reactive resin composition consisting of 100 weight parts of a polyol component and A weight parts of a polyisocyanate component and solvent is applied and dried onto the second release film to obtain the second lamination consisting of a urethane resin layer with a cross-link ratio of 20–93% on one side of the second release film, and a process in which the first lamination and the second lamination are laminated together in such a way that the olefin-based resin layer of the first lamination and the urethane resin layer of the second lamination contact each other and the reaction of the urethane resin is completed.

The process for obtaining the aforementioned first lamination is a process of forming a pressure-sensitive adhesive layer and then the first release film on one side of the olefin-based resin layer. How each layer should be formed is not limited in particular, and any method can be used, examples of which include the following:

(1) a method in which the olefin-based resin and a hot melt type pressure-sensitive adhesive are coextruded and then the first release film is laminated onto the pressure-sensitive adhesive sheet, (2) a method, as described in the third of the present invention, in which the pressure-sensitive adhesive is formed on the first release film, and then the olefin-based resin film which was formed separately is placed on top, and (3) a method in which the olefin-based resin film is prepared first, the pressure-sensitive adhesive sheet is laminated onto one side of it, and then the first release film is placed on top.

The process in which the aforementioned second lamination is obtained is the same as the process by which the second lamination is obtained in the third of the present invention. Except for the fact that the first lamination and the second lamination are laminated such that the olefin-based resin layer and the urethane resin layer of the second lamination contact each other, the reaction of the urethane resin is completed in the manner described in the third of the present invention.

The fifth of the present invention is a method of manufacturing the pressure-sensitive adhesive sheet of the second of the present invention. This method comprises a process in which the first lamination is obtained by laminating a pressure-sensitive adhesive layer and then the first release film onto one side of the olefin-based resin layer, and a process in which a reactive resin composition consisting of 100 weight parts of a polyol component and A weight parts of a polyisocyanate component and solvent is applied and dried onto the aforementioned olefin-based resin layer to form a urethane resin layer with a cross-link ratio of 20–93% and then the second release film is laminated onto said urethane resin layer, followed by completion of the reaction of the urethane resin.

The process in which the aforementioned first lamination is obtained is the same as the process by which the first lamination is obtained in the fourth of the present invention.

In the fifth of the present invention, the next step is to apply a reactive resin composition consisting of 100 weight parts of a polyol component and A weight parts of a polyisocyanate component and solvent onto the aforementioned olefin-based resin layer, followed by drying, to form a urethane resin layer with a cross-link ratio of 20–93%. This formation process is the same as the process of obtaining the second lamination in the third of the present invention except for the fact that the aforementioned first lamination is used instead of the release film.

Finally, the second release film is laminated onto the urethane resin layer with a cross-link ratio of 20–93% and the urethane resin reaction is completed. Lamination of the second release film can be easily accomplished by stacking the second release film on top of the four layer lamination of the first release film, the pressure-sensitive adhesive layer, the olefin-based resin layer, and the urethane resin laminated one after another, followed by pressing. Stacking and pressing should preferably be done at a temperature near the glass transition temperature of the urethane resin. The method for completing the urethane resin reaction is as described in the third of the present invention.

In the present invention, for the purpose of improving the adhesion between the pressure-sensitive adhesive layer and the urethane resin or the olefin-based resin layer and the adhesion between the urethane resin layer and the olefin-based resin, a treatment to provide surface polarity, such as the corona discharge treatment or the flame treatment, can be performed on the urethane resin layer and/or the olefin-based resin layer; an anchor coat which is commonly used as the anchor coat for a pressure-sensitive adhesive tape can also be laminated.

For the laminating method to laminate the first lamination and the second lamination, and to laminate the urethane resin layer and the second release film, any lamination method can be used: examples include a method in which the two layers are stacked and then pressed, and a method in which the two layer are stacked and then pressed while being heated with a heating roll.

EXAMPLES

The present invention is described in detail by referring to Examples below. The present invention is not limited to these examples.

Materials used in Examples are described first. In Examples, acrylpolyol, polyisocyanate, the olefin-based resin, and the release film are referred to by the following abbreviations.

Acrylpolyol

Acrylpolyol A1, A2, A4, and A5 are ethyl acetate solutions of the copolymers of prescribed amounts of monomers as shown. in Table 1. The concentration of the copolymer is 40 wt %. The glass transition temperature Tg and the hydroxyl group value are shown in Table 1.

Acrylpolyol A3 is a mixture of 100 weight parts of an ethyl acetate solution of copolymer consisting of 16 wt % 2-hydroxyethyl methacrylate, 10 wt % isobutyl methacrylate, 8 wt % 2-ethylhexyl acrylate, 50 wt % methyl methacrylate, 15 wt % styrene, and 1 wt % methacrylic acid (the concentration of the copolymer is 40 wt %) and 8 weight parts of an ethyl acetate solution of caprolacton-modified polyesterdiol (hydroxyl group value 45 mg/g, weight average molecular weight approximately 2,000) (trade name Softner 5 from Nippon Paint Co., Ltd. with a diol concentration of 75 wt %).

The glass transition temperature Tg and the hydroxyl group value are shown in Table 1.

TABLE 1

| | Acrylpolyol (wt %) | | | | |
|---|---|---|---|---|---|
| | A1 | A2 | A3 | A4 | A5 |
| 2-hydroxyethyl methacrylate | 16 | 7 | mixture | 46 | 8 |
| Isobutyl methacrylate | 72 | 32 | | 35 | 20 |
| n-octyl methacrylate | 2 | — | | — | — |
| 2-ethylhexyl acrylate | — | 14 | | 11 | 7 |
| Methyl methacrylate | — | 40 | | 7 | 60 |
| Styrene | 10 | 7 | | — | — |
| Acrylonitrile | — | — | | 1 | — |
| Methacrylic acid | — | — | | — | 5 |
| Glass transition temperature (° C.) | 66 | 47 | 41 | 40 | 70 |
| Hydroxyl group value (mg/g-polymer) | 70 | 32 | 66 | 200 | 36 |

Polyisocyanate

Polyisocyanate and mixtures of prescribed amounts of polyisocyanate, shown in Table 2, were used. 15 The distance between cross-links is shown in Table 2.

TABLE 2

| | Polyisocyanate (wt %) | | | | |
|---|---|---|---|---|---|
| | B1 | B2 | B3 | B4 | B5 |
| HLS | 100 | — | — | — | — |
| HL | — | 80 | 100 | 30 | — |
| N3200 | — | 20 | — | 70 | — |
| TPLS | — | — | — | — | 100 |
| Distance between cross-links | 391 | 236 | 250 | 202 | 592 |

HLS; Trade name Coronate HLS from Nippon Polyurethane Industries Co., Ltd.
HL; Trade name Coronate HL from Nippon Polyurethane Industries Co., Ltd.
N3200; Trade name Sumijule N3200 from Sumitomo Bayer Urethane Co., Ltd.
TPLS; Trade name Desmodule TPLS2010/1 from Sumitomo Bayer Urethane Co., Ltd.

Olefin-based Resin

The eluted amount, obtained by the cross fractionation method, and the weight average molecular weight of the olefin-based resins used to form the olefin-based resin layer are shown in Table 3.

TABLE 3

| Elution amount obtained by the cross fractionation method | | | | |
|---|---|---|---|---|
| | KS | M40 | PP | EBR |
| Elution amount (wt %) | | | | |
| ° C. | 47 | 0 | 2 | 8 |
| Higher than 0° C. and 70° C. or lower | 20 | 40 | 17 | 91 |
| Higher than 70° C. | 33 | 60 | 81 | 1 |
| Weight average molecular weight | 313000 | 66000 | 70000 | 72000 |

KS; Polypropylene resin, trade name Adflex KS081P from Montel SDK Sunrise Co., Ltd.
M40; Linear low density polyethylene, trade name Niporon from Tosoh Corporation
PP; Polypropylene resin, trade name J Aromer PC630S from Japan Polyolefin Co., Ltd.
EBR; Ethylene-butene copolymer, trade name Esprene N0416 from Sumitomo Chemical Co., Ltd.

Pressure-sensitive Adhesive 1.0 weight parts of an isocyanate cross-linking agent (trade name Coronate L-55E from Nippon Polyurethane Co., Ltd., an ethyl acetate solution with a solid content of 55%) was mixed into 100 weight parts of a 30 wt % ethyl acetate solution of a copolymer (weight average molecular weight 600,000, weight average molecular weight/number average molecular weight=4.5) prepared by copolymerizing 70.0 wt % n-butyl acrylate,20.0 wt % 2-ethylhexyl acrylate, 9.7 wt % acrylic acid, and 0.3 wt % 2-hydroxyethyl acrylate, and the mixture was used as the pressure-sensitive adhesive.

Coloring Agent

Trade name Chromophtal DPP Red BP from Ciba Specialty Chemicals K.K.

Separating Paper

C1; Double-side polyethylene laminated paper with a silicone separation treatment on one side Trade name Sumileas from Kaito Chemical Industries Co., Ltd.

C2; oriented polypropylene film Trade name Taiko FOA-P2 from Futamura Chemical Industries Co., Ltd.

C3; Paper with the alkyd resin treatment on both sides Trade name Koteishi (release film) ES160 from Lintech Co., Ltd.

C4; Matted oriented polypropylene film Trade name Taiko FOR-MP2 from Futamura Chemical Industries Co. , Ltd.

C5; Polyethylene terephthalate film with the alkyd resin treatment on both sides Trade name Tetoron film S-PZ from Teijin Ltd.

C6; Polyethylene terephthalate film with the silicone separation treatment on both sides, trade name Beaurex from Teijin Ltd.

The methods for measuring physical properties and such are described now. The hydroxyl group value of the polyol component, the distance between cross-links, the strength at a 2% elongation, the breaking elongation, the residual stress ratio, and the cross fractionation of the urethane resin, and the 180-degree peeling strength between the urethane resin and the second release film are measured in the manner described in the "Disclosure of the invention" section.

Hardening Properties

The obtained pressure-sensitive adhesive sheet was fed into a 110° C. hot air oven to dry for five minutes, gauze was pressed onto the urethane resin layer, and the gauze was checked for adhesion.

○; No gauze adhesion

X ; Gauze adhesion was observed.

Shelf Life

Gauze was pressed onto the obtained pressure-sensitive adhesive sheet such that the load was 10 g/cm2; after 24 hours at 40 ° C. in this condition, the gauze was removed and the surface of the urethane resin layer was observed.

○; No significant change was observed in the surface gloss.

Δ; Some change was observed in the surface gloss.

X ; A significant change was observed in the surface gloss.

Easy-tear Properties

The obtained pressure-sensitive adhesive sheet was fed into a cutting machine manufactured by Mimaki Engineering Co., Ltd. and 10 mm-size letters were cut out to observe the cuts.

○; Cuts were perfect.

Δ; Partial peeling was observed.

X ; There were some portions left uncut and/or letters were ripped when scraps were removed.

Pasting Properties

The pressure-sensitive adhesive sheet was pasted onto the peaks of an aluminum corrugated board with a curvature of 20 mm and a depth of 15 mm; the pressure-sensitive adhesive sheet was then pressed into the valleys and pasted on them; after one week of letting it stand at 23° C., the pressure-sensitive adhesive sheet was checked for peeling (separation).

○; Separation with a width of 1 mm or less was observed.

Δ; Separation was observed near the bottoms.

X ; Separation occurred all over, or the pressure-sensitive adhesive sheet did not conform to the shape of the board during the pasting process and cracked.

Workability

A 100 mm square pressure-sensitive adhesive sheet was pasted onto an aluminum plate, and the pasting condition was evaluated.

○; The sheet was pasted without any crease.

Δ; Pasting was difficult because creases were easy to develop.

X ; Creases developed.

Weather Resistance

The obtained pressure-sensitive adhesive sheet was fed into a sunshine weather meter. After 2,000 hours of exposure, the surface condition was evaluated.

○; Almost no change was observed.

Δ; Slight discoloring and a difference in gloss were observed.

X ; The appearance was clearly different.

Combustion Chlorine Production Test

The obtained pressure-sensitive adhesive sheet was burned in a sealed container, and the produced gas was captured in water; chlorine was measured with gas chromatography (detection limit 20 ppm).

○; Chlorine was not detected.

Δ; Chlorine was detected.

Adhesion

The obtained pressure-sensitive adhesive sheet was fed into a sunshine weather meter. After 1,000 hours of exposure, according to the JIS-K5400 cross cut evaluation method, slits were made at 1 mm intervals on a 10 mm square pressure-sensitive adhesive sheet to form 100 squares. A cellophane tape was pressed on this sample, and then peeled. The number of squares in which the urethane resin layer was peeled off was counted.

○; No peeling occurred.

Δ; 1–25 squares peeled.

X ; 26 or more squares peeled.

Examples 1–6, Comparative Examples 1–6

Using a Baker-type applicator, the pressure-sensitive adhesive was applied onto release film C1; after five minutes of drying in a 110° C. hot air oven, the first lamination with a 30 micrometer-thick pressure-sensitive adhesive layer was obtained.

Prescribed amounts (solid, as indicated in Table 4 and Table 5) of acrylpolyol, polyisocyanate, and the coloring agent, as well as 0.1 weight parts of the catalyst (dioctyl tin dilaurate, trade name Stann SNT-1F from Sankyo Organic Synthesis Co., Ltd.) and 1 weight part of the photo stabilizer (trade name Tinuvin 622 from Ciba Specialty Chemicals K. K.) were mixed to form a composition, which was then applied on release film C2 with a Baker-type applicator, and dried for five minutes in a 110° C. hot air oven to obtain the second lamination with a urethane resin layer with a prescribed thickness as shown in Table 4 and Table 5.

The obtained first lamination and the second lamination were stacked together such that the pressure-sensitive adhesive layer of the first lamination and the urethane resin layer of the second lamination contacted each other, and then these were pressed and laminated by a heated roller at 100° C. to obtain the pressure-sensitive adhesive sheet. The obtained pressure-sensitive adhesive sheet was cured for three days at 40° C. and then the physical properties of the pressure-sensitive adhesive sheet were measured; the results are shown in Table 4 and Table 5.

The cross-link ratio of the urethane resin at the time of lamination and the peeling strength at 180 degrees of the second release film C2 were measured; the results are shown in Table 4 and Table 5.

Comparative Example 7

100 weight parts of vinyl-chloride resin (trade name PHS-10 from Kanegafuchi Chemical Industry Co., Ltd.), 7 weight parts of a coloring agent, 30 weight parts of an adipic ester-based plasticizer (trade name Adekasizer PN300 from Asahi Denka Kogyo K. K.), 5 weight parts of a barium/zinc combination-based heat stabilizer (trade name MARK SC34 from Asahi Denka Kogyo K. K.), and 150 weight parts of a mixed solvent (trade name Sorbesso from Exxon Chemical Ltd.) were mixed to obtain sol, which was applied on release film C3 with a Baker type applicator such that the coating film thickness after drying would be 50 micrometers; after eight minutes of drying in a 200° C. hot air oven, a vinyl chloride resin film with a thickness of 50 micrometers was obtained.

The obtained vinyl chloride resin film and the first lamination were stacked together such that the pressure-sensitive adhesive layer of the first lamination and the film contacted each other, and then these were pressed and laminated by a heated roller at 100° C. to obtain the pressure-sensitive adhesive sheet. The obtained pressure-sensitive adhesive sheet was cured for three days at 40° C. and then the physical properties of the pressure-sensitive adhesive sheet were measured; the results are shown in Table 5.

TABLE 4

| Example | | 1 | 2 | 3 | 4 | 5 | 6 |
|---|---|---|---|---|---|---|---|
| Urethane resin layer | | | | | | | |
| Blend ratio (weight parts) | Acrylpolyol | A1 100 | A2 100 | A3 100 | A3 100 | A1 100 | A4 100 |
| | Polyisocyanate | B1 68 | B1 31 | B1 64 | B2 43 | B3 53 | B3 152 |
| | Coloring agent | — | 5 | — | — | 5 | 5 |
| Thickness (micrometers) | | 50 | 50 | 50 | 45 | 40 | 140 |
| a | | 0.097 | 0.097 | 0.097 | 0.097 | 0.097 | 0.097 |
| Cross link ratio (wt %) | | 30 | 30 | 30 | 40 | 40 | 40 |
| Peeling strength at 180 degree (g) | | 18 | 18 | 18 | 12 | 12 | 12 |
| Physical properties of the pressure-sensitive adhesive sheet | | | | | | | |
| Strength at 2% elongation | | | | | | | |
| 5° C. (Kg/15 mm-width) | | 1.45 | 1.25 | 1.20 | 1.35 | 1.20 | 1.10 |
| 35° C. | | 0.75 | 0.65 | 0.60 | 0.73 | 0.60 | 0.50 |
| Breaking elongation (%) | | | | | | | |
| 5° C. | | 70 | 140 | 180 | 140 | 60 | 60 |
| 35° C. | | 95 | 260 | 210 | 210 | 80 | 120 |
| Residual stress ratio (%) | | 12 | 14 | 15 | 28 | 25 | 58 |
| Hardening properties | | ○ | ○ | ○ | ○ | ○ | Δ |
| Shelf life | | ○ | ○ | ○ | ○ | ○ | Δ |
| Easy-tear properties | | ○ | ○ | ○ | ○ | ○ | X |
| Pasting properties | | ○ | ○ | ○ | ○ | ○ | ○ |
| Workability | | ○ | ○ | ○ | ○ | ○ | X |
| Weather resistance | | ○ | ○ | ○ | ○ | ○ | ○ |
| Combustion chlorine production test | | ○ | ○ | ○ | ○ | ○ | ○ |

TABLE 5

| Comparative example | | 1 | 2 | 3 | 4 | 5 | 6 | 7 |
|---|---|---|---|---|---|---|---|---|
| Urethane resin layer | | | | | | | | PVC |
| Blend ratio (weight parts) | Acryl-polyol | A1 100 | A1 100 | A1 100 | A1 100 | A5 100 | A1 100 | — |
| | Poly-isocyanate | B1 34 | B1 10231 | B1 34 | B2 65 | B3 27 | B3 53 | — |
| | Coloring agent | 5 | — | 5 | 5 | 5 | 5 | 7 |
| Thickness (micrometers) | | 50 | 50 | 50 | 50 | 20 | 20 | 50 |
| a | | 0.048 | 0.145 | 0.097 | 0.097 | 0.097 | 0.097 | — |
| Cross link ratio (wt %) | | 30 | 30 | 40 | 25 | 40 | 40 | — |

TABLE 5-continued

| Comparative example | 1 | 2 | 3 | 4 | 5 | 6 | 7 |
|---|---|---|---|---|---|---|---|
| Peeling strength at 180 degree (g) | 18 | 18 | 10 | 22 | 12 | 12 | — |
| Physical properties of the pressure-sensitive adhesive sheet | | | | | | | |
| Strength at 2% elongation | | | | | | | |
| 5° C. (Kg/15 mm-width) | 2.40 | 1.00 | 2.70 | 0.60 | 1.40 | 0.70 | 2.00 |
| 35° C. | 1.50 | 0.40 | 2.40 | 0.40 | 0.60 | 0.40 | 0.60 |
| Breaking elongation (%) | | | | | | | |
| 5° C. | 25 | 190 | 10 | 200 | 10 | 40 | 110 |
| 35° C. | 46 | 260 | 40 | 320 | 40 | 110 | 180 |
| Residual stress ratio (%) | 23 | 65 | — | 14 | — | 32 | 30 |
| Hardening properties | ○ | ○ | ○ | X | ○ | ○ | ○ |
| Shelf life | ○ | ○ | ○ | X | ○ | ○ | ○ |
| Easy-tear properties | X | ○ | X | ○ | X | X | X |
| Pasting properties | X | Δ | X | ○ | X | X | X |
| Workability | ○ | X | ○ | X | ○ | X | ○ |
| Weather resistance | Δ | ○ | ○ | Δ | ○ | ○ | ○ |
| Combustion chlorine production test | ○ | ○ | ○ | ○ | ○ | ○ | X |

Examples 7–12, Comparative Example 8

A composition consisting of 100 weight parts of the olefin-based resin shown in Table 6 and Table 7, 3.5 weight parts of titanium oxide powder, 0.007 weight parts of an antioxidant (trade name Irganox 1076 from Ciba Specialty Chemicals. K.K.), and 0.021 weight parts of a photo stabilizer (Tinuvin 622 from Ciba Specialty Chemicals K. K.) was fed to an extruder, and extruded by a T die at 230° C. (200° C. for Example 7 only) to obtain an olefin-based resin film with a prescribed thickness as indicated in Table 6 and Table 7. The physical properties of the obtained olefin-based resin film were measured and the results are shown in Table 6 and Table 7.

A corona discharge treatment was conducted on both sides of the obtained film and the surface energy of the film was adjusted to 45 dynes based on measurement using the wetting agent.

Using a Baker-type applicator, the pressure-sensitive adhesive was applied on release film C1; after five minutes of drying in a 110° C. hot air oven, the first lamination with a 30 micrometer-thick pressure-sensitive adhesive layer was obtained. Said olefin-based resin film was stacked on top of this pressure-sensitive adhesive layer to obtain the first lamination.

Prescribed amounts (solid, as indicated in Table 6 and Table 7) of acrylpolyol, polyisocyanate, and the coloring agent, as well as 0.1 weight parts of the catalyst (dioctyl tin dilaurate, trade name Stann SNT-1F from Sankyo Organic Synthesis Co., Ltd.) and 1 weight part of the photo stabilizer (trade name Tinuvin 622 from Ciba Specialty Chemicals K. K.) were mixed to form a composition, which was then applied onto the olefin-based resin film side of the first lamination with a Baker-type applicator, and dried for five minutes in a 110° C. hot air oven to obtain a urethane resin layer with a prescribed thickness as indicated in Table 6 and Table 7; release film C2 was then laminated onto the urethane resin layer to obtain a pressure-sensitive adhesive sheet. The obtained pressure-sensitive adhesive sheet was cured for three days at 40° C. and then the physical properties of the pressure-sensitive adhesive sheet were measured; the results are shown in Table 6 and Table 7.

The cross-link ratio of the urethane resin at the time of lamination and the peeling strength at 180 degrees of the second release film C2 were measured; the results are shown in Table 6 and Table 7.

Comparative Example 9

100 weight parts of vinyl chloride resin (trade name PHS-10 from Kanegafuchi Chemical Industry Co., Ltd.), 30 weight parts of titanium oxide powder (trade name Discole DAP050 White from Dainichi Seika Fine Chemicals Mfg. Co., Ltd.), 30 weight parts of an adipic ester-based plasticizer (trade name Adekasizer PN300 from Asahi Denka Kogyo K. K.), 5 weight parts of a barium/zinc combination-based heat stabilizer (trade name MARK SC34 from Asahi Denka Kogyo K. K.), and 150 weight parts of a mixed solvent (trade name Sorbesso from Japan Mining Co., Ltd.) were mixed to obtain sol, which was applied on release film C3 with a Baker type applicator such that the coating film thickness after drying would be 50 micrometers; after eight minutes of drying in a 200° C. hot air oven, a vinyl chloride resin film with a thickness of 40 micrometers was obtained. The physical properties of the obtained vinyl chloride resin film were measured and the results are shown in the physical property column for the olefin-based resin layer in Table 7.

A corona discharge treatment was conducted on both sides of the obtained film and the surface energy of the film was adjusted to 45 dynes based on measurement using the wetting agent.

Using a Baker-type applicator, the pressure-sensitive adhesive was applied onto release film C1; after five minutes of drying in a 110° C. hot air oven, the first lamination with a 30 micrometer-thick pressure-sensitive adhesive layer was obtained. Said vinyl chloride resin film was stacked on top of this pressure-sensitive adhesive layer to obtain the first lamination.

Prescribed amounts (solid, as indicated in Table 7) of acrylpolyol, polyisocyanate, and the coloring agent, as well as 0.1 weight parts of the catalyst (dioctyl tin dilaurate, trade name Stann SNT-1F from Sankyo Organic Synthesis Co., Ltd.) and 1 weight part of the photo stabilizer (trade name Tinuvin 622 from Ciba Specialty Chemicals K. K.) were mixed to form a composition, which was then applied onto the vinyl chloride resin film side of the first lamination with a Baker-type applicator, and dried for five minutes in a 110° C. hot air oven to obtain a 20 micrometer-thick urethane resin layer; release film C2 was then laminated onto the urethane resin layer to obtain a pressure-sensitive adhesive sheet. The obtained pressure-sensitive adhesive sheet was cured for three days at 40° C. and then the physical properties of the pressure-sensitive adhesive sheet were measured; the results are shown in Table 7.

The cross-link ratio of the urethane resin at the time of lamination and the peeling strength at 180 degrees of the second release film C2 were measured; the results are shown in Table 7.

Comparative Example 10

A composition consisting of 100 weight parts of the olefin-based resin shown in Table 7, 3.5 weight parts of titanium oxide powder, 0.007 weight parts of an antioxidant (trade name Irganox 1076 from Ciba Specialty Chemicals K. K.), and 0.021 weight parts of a photo stabilizer (Tinuvin 622 from Ciba Specialty Chemicals K. K. ) was fed into an extruder and extruded by a T die at 230° C. to obtain an olefin-based resin film with a thickness of 50 micrometers. The physical properties of the obtained olefin-based resin film were measured and the results are shown in Table 7.

A corona discharge treatment was conducted on both sides. of the obtained film and the surface energy of the film was adjusted to 45 dynes based on measurement using the wetting agent.

Using a Baker-type applicator, the pressure-sensitive adhesive was. applied on release film C1; after five minutes of drying in a 110° C. hot air oven, the first lamination with a 30 micrometer-thick pressure-sensitive adhesive layer was obtained. The side with the corona discharge treatment of said olefin-based resin film was stacked on top of this pressure-sensitive adhesive layer to obtain a pressure-sensitive adhesive sheet. The physical properties of the obtained pressure-sensitive adhesive sheet were measured and the results are shown in Table 7.

TABLE 6

| Example | | 7 | 8 | 9 | 10 | 11 | 12 |
|---|---|---|---|---|---|---|---|
| Urethane resin layer | | | | | | | |
| Blend ratio (weight parts) | Acrylpolyol | A1 | A1 | A1 | A1 | A1 | A3 |
| | | 100 | 100 | 100 | 100 | 100 | 100 |
| | Polyisocyanate | 83 | 83 | 83 | 83 | 83 | 81 |
| | | 53 | 53 | 53 | 53 | 53 | 64 |
| | Coloring agent | 5 | 5 | 5 | 5 | 5 | 5 |
| Thickness (micrometers) | | 20 | 20 | 20 | 50 | 5 | 20 |
| a | | 0.097 | 0.097 | 0.097 | 0.097 | 0.097 | 0.097 |
| Cross link ratio (wt %) | | 50 | 50 | 50 | 50 | 50 | 40 |
| Peeling strength at 180 degree (g) | | 10 | 10 | 10 | 10 | 10 | 12 |
| Olefin-based resin layer | | | | | | | |
| Blend ratio (weight parts) | KS | — | 100 | 30 | — | 30 | 30 |
| | M40 | 100 | — | — | — | — | — |
| | PP | — | — | 70 | 70 | 70 | 70 |
| | EBR | — | — | — | 30 | — | — |
| Thickness (micrometer) | | 50 | 100 | 40 | 40 | 40 | 40 |
| Physical properties of the olefin-based resin layer (23° C.) | | | | | | | |
| Strength at 2% elongation (Kg/15 mm-width) | | 0.95 | 0.62 | 0.76 | 0.35 | 0.76 | 0.76 |
| Breaking elongation (%) | | 720 | 650 | 420 | 650 | 420 | 420 |
| Residual stress ratio (%) | | 76 | 45 | 46 | 80 | 46 | 46 |
| Physical properties of the pressure-sensitive adhesive sheet | | | | | | | |
| Strength at 2% elongation | | | | | | | |
| 5° C. (Kg/15 mm-width) | | 1.36 | 1.02 | 1.02 | 1.52 | 1.02 | 1.08 |
| 35° C. | | 0.78 | 0.56 | 0.52 | 1.00 | 0.60 | 0.57 |
| Breaking elongation (%) | | | | | | | |
| 5° C. | | 180 | 185 | 100 | 60 | 240 | 200 |
| 35° C. | | 220 | 240 | 160 | 85 | 280 | 240 |
| Residual stress ratio (%) | | 74 | 45 | 45 | 80 | 44 | 42 |
| Hardening properties | | ○ | ○ | ○ | ○ | ○ | ○ |
| Shelf life | | ○ | ○ | ○ | ○ | ○ | ○ |
| Easy-tear properties | | ○ | ○ | ○ | Δ | Δ | ○ |
| Pasting properties | | Δ | ○ | ○ | X | ○ | ○ |
| Workability | | Δ | ○ | ○ | ○ | ○ | ○ |
| Weather resistance | | ○ | ○ | ○ | ○ | ○ | ○ |
| Combustion chlorine production test | | ○ | ○ | ○ | ○ | ○ | ○ |

TABLE 7

| | | Example | | |
|---|---|---|---|---|
| | | 8 | 9 | 10 |
| Urethane resin layer | | | | |
| Blend ratio (weight parts) | Acrylpolyol | A1 | A1 | — |
| | | 100 | 100 | — |
| | Polyisocyanate | B3 | B3 | — |
| | | 53 | 53 | — |
| | Coloring agent | 5 | 5 | — |
| Thickness (micrometers) | | 30 | 20 | — |
| a | | 0.097 | 0.097 | — |
| Cross link ratio (wt %) | | 50 | 45 | — |
| Peeling strength at 180 degree (g) | | 10 | 14 | — |
| Olefin-based resin layer | | | | |
| Blend ratio (weight parts) | KS | — | — | 50 |
| | PP | 100 | — | 50 |
| | PVC | — | 100 | — |
| Thickness (micrometers) | | 50 | 40 | 50 |
| Physical properties of the olefin-based resin layer (23° C.) | | | | |
| Strength at 2% elongation (Kg/15 mm-width) | | 2.24 | 1.05 | 0.86 |
| Breaking elongation (%) | | 12 | 120 | 400 |
| Residual stress ratio (%) | | 65 | 25 | 42 |
| Physical properties of the pressure-sensitive adhesive sheet | | | | |
| Strength at 2% elongation | | | | |
| 5° C. (Kg/15 mm-width) | | 2.40 | 2.1 | 1.10 |
| 35° C. | | 1.00 | 0.65 | 0.60 |
| Breaking elongation (%) | | | | |
| 5° C. | | 5 | 90 | 380 |
| 35° C. | | 30 | 150 | 420 |
| Residual stress ratio (%) | | — | 28 | 42 |
| Hardening properties | | ○ | ○ | ○ |
| Shelf life | | ○ | ○ | ○ |
| Easy-tear properties | | x | ○ | Δ |
| Pasting properties | | x | x | x |
| Workability | | ○ | ○ | ○ |
| Weather resistance | | ○ | ○ | x |
| Combustion chlorine production test | | ○ | x | ○ |

Examples 13–15, Comparative Examples 11 and 12

In the same manner as in Example 1, the pressure-sensitive adhesive was applied and dried onto the first release film C1 to obtain the first lamination.

The composition for the urethane resin used in Example 3 was applied onto the second release film shown in Table 8 such that the thickness of the urethane resin would be 50 micrometers, and this was fed into a drying oven with an oven length of 35 m and an oven internal temperature of 100° C. at a feeding rate as indicated in Table 8, followed by drying, to obtain the second lamination.

The obtained first lamination and the second lamination were stacked together such that the pressure-sensitive adhesive layer of the first lamination and the urethane resin layer of the second lamination contacted each other, and then pressed and laminated by a heated roller at 100° C. to obtain the pressure-sensitive adhesive sheeet. Adhesion between the urethane resin layer of the obtained pressure-sensitive adhesive sheet and the second release film was evaluated and the results are shown in Table 8. The obtained pressure-sensitive adhesive sheet was cured for three days at 40° C. and then the curability of the pressure-sensitive adhesive sheet were measured; the results are shown in Table 8.

The cross-link ratio of the urethane resin at the time of lamination and the peeling strength at 180 degrees of the second release film C2 were measured; the results are shown in Table 8. When the second release film of the pressure-sensitive adhesive sheet obtained in Example 15 was peeled, the matt pattern of the second release film was cleanly transferred onto the urethane resin layer.

TABLE 8

|  | Example 13 | Example 14 | Example 15 | Comparative example 11 | Comparative example 12 |
|---|---|---|---|---|---|
| Second release film | C2 | C3 | C4 | C2 | C2 |
| Feed rate (m/minute) | 20 | 20 | 25 | 3 | 40 |
| Cross link ratio (wt %) | 65 | 65 | 40 | 97 | 15 |
| Peeling strength at 180 degrees (g) | 25 | 18 | 27 | 5 | 40 |
| Hardening properties | ○ | ○ | ○ | ○ | ○ |
| Adhesion between the urethane resin layer and second release film | Good | Good | Good | Separation during preparation | Good; a large amount of residual solvent |

Example 16

The first lamination was obtained in the same manner as in Example 9. The composition for the urethane resin used in Example 9 was applied onto the second release film such that the thickness of the urethane resin would be 20 micrometers, and this was fed into a drying oven with an oven length of 35 m and an oven internal temperature of 100° C. at a feeding rate as indicated in Table 8, followed by drying, to obtain the second lamination.

The obtained first lamination and the second lamination were stacked together such that the olefin-based resin layer of the first lamination and the urethane resin layer of the second lamination contacted each other, and then these were pressed and laminated by a heated roller at 100° C. to obtain the pressure-sensitive adhesive sheet. Adhesion between the urethane resin layer of the obtained pressure-sensitive adhesive sheet and the second release film was evaluated and the results are shown in Table 9. The obtained pressure-sensitive adhesive sheet was cured for three days at 40° C. and then the curability and adhesion of the pressure-sensitive adhesive sheet were measured; the results are shown in Table 9.

The cross-link ratio of the urethane resin at the time of lamination and the peeling strength at 180 degrees of the second release film C2 were measured; the results are shown in Table 9.

Examples 17–20, Comparative Examples 13 and 14

The first lamination was obtained in the same manner as in Example 9. In the same manner as in Example 9, the composition for the urethane resin used in Example 9 was applied onto the olefin-based resin layer of the first lamination such that the thickness of the urethane resin would be 20 micrometers, and this was fed into a drying oven with an oven length of 35 m and an oven internal temperature of 100° C. at a prescribed feeding rate as indicated in Table 9, followed by drying, to obtain the second lamination.

The urethane resin layer of the obtained second lamination and the prescribed second release film indicated in Table 9 were stacked together and then pressed and laminated by a heated roller at 100° C. to obtain the pressure-sensitive adhesive sheet. The temperature of the heated roller in Example 20 was a normal temperature.

Adhesion between the urethane resin layer of the obtained pressure-sensitive adhesive sheet and the second release film was evaluated and the results are shown in Table 9. The obtained pressure-sensitive adhesive sheet was cured for three days at 40° C. and then the curability and adhesion of the pressure-sensitive adhesive sheet were measured; the results are shown in Table 9.

The cross-link ratio of the urethane resin at the time of lamination and the peeling strength at 180 degrees of the second release film were measured; the results are shown in Table 9.

TABLE 9

|  | Example 16 | Example 17 | Example 18 | Example 19 | Example 20 | Comparative example 13 | Comparative example 14 |
|---|---|---|---|---|---|---|---|
| Second release film | C2 | C2 | C2 | C5 | C6 | C2 | C2 |
| Feed rate (m/minute) | 20 | 20 | 20 | 20 | 20 | 3 | 40 |
| Cross link ratio (wt %) | 65 | 65 | 65 | 65 | 65 | 98 | 15 |
| Peeling strength at 180 degrees (g) | 25 | 12 | 23 | 100 | 5 | 3 | 40 |
| Hardening properties | ○ | ○ | ○ | ○ | ○ | ○ | ○ |
| Adhesion | ○ | ○ | ○ | ○ | ○ | X | ○ |
| Adhesion | Good | Good | Good | Good | Good | Separation | Good; |

TABLE 9-continued

|  | Example 16 | Example 17 | Example 18 | Example 19 | Example 20 | Comparative example 13 | Comparative example 14 |
| --- | --- | --- | --- | --- | --- | --- | --- |
| between the urethane resin layer and second release film |  |  |  |  |  | during preparation | a large amount of residual solvent |

INDUSTRIAL APPLICABILITY OF THE INVENTION

The configuration of the pressure-sensitive adhesive tape or sheet of the present invention is as described above, and therefore it is soft and superior in terms of its conformability onto the unevenness and curved surfaces of a substrate and also in terms of easy-tear properties. Since it does not contain chlorine, dioxine is not generated when it is incinerated and therefore there are no environmental health problems. As a result, it is particularly suitable for marking tapes and sheets.

The method of manufacturing the pressure-sensitive adhesive tape or sheet of the present invention is as described above, and therefore the pressure-sensitive adhesive tape or sheet can be easily manufactured.

What is claimed is:

1. A pressure-sensitive adhesive tape or sheet prepared by laminating a pressure-sensitive adhesive layer onto one side of an urethane resin layer consisting of 100 weight parts of a polyol component and A weight parts of a polyisocyanate component with a distance between cross-links (weight average molecular weight/number of isocyanate groups) of 220–570, wherein the aforementioned A is represented by the following equation $$A = 100aX/Y$$

(in this equation, a is a constant 0.067–0.135, X is the hydroxide value of the aforementioned polyol component, and Y is the weight percent concentration of isocyanate groups in the polyisocyanate component), and, at 5° C. and 35° C., the strength at a 2% elongation is 0.40–2.20 Kg/15 mm-width and the breaking elongation is 50–300%, wherein the polyol component is acryl polyol with a glass transition temperature (Tg) of 0–100° C. and a hydroxide group value of 20–150.

2. The pressure-sensitive adhesive tape or sheet of claim 1 wherein the urethane resin layer contains 0.1–70 weight parts of a coloring agent.

3. The pressure-sensitive adhesive tape or sheet of claim 1 wherein the distance between cross-links is 250–550.

4. The pressure-sensitive adhesive tape or sheet of claim 1 wherein the thickness of the urethane resin layer is 30–120 micrometers.

5. The pressure-sensitive adhesive tape or sheet of claim 1 wherein the residual stress ratio 10 minutes after 10% elongation at 23° C. is 60% or less.

6. The pressure-sensitive adhesive tape or sheet of claim 1 wherein, at 5° C. and 35° C., the strength at a 2% elongation is 0.50–2.10 Kg/15 mm-width and the breaking elongation is 70–250%.

7. A marketing tape or sheet comprising the pressure-sensitive adhesive tape or sheet of claim 1.

8. A pressure-sensitive adhesive tape or sheet prepared by laminating one after another a urethane resin layer consisting of 100 weight parts of a polyol component and A weight parts of a polyisocyanate component with a distance between cross-links (weight average molecular weight-number of isocyanate average molecular weight/number of isocyanate groups) of 220–570, an olefin-based resin layer, and a pressure-sensitive adhesive layer, wherein the aforementioned A is represented by the following equation $$A = 100aX/Y$$

(in this equation, a is a constant 0.067–0.135, X is the hydroxide value of the aforementioned polyol component, and Y is the weight percent concentration of isocyanate groups in the polyisocyanate component), and, at 5° C. and 35° C., the strength at a 2% elongation is 0.40–2.20 Kg/15 mm-width and the breaking elongation is 50–300%, wherein the polyol component is acryl polyol with a glass transition temperature (Tg) of 0–100° C. and a hydroxide group value of 20–150, said olefin-based resin layer being a non-chlorinated olefin-based resin.

9. The pressure-sensitive adhesive tape or sheet of claim 8 wherein the urethane resin layer contains 0.1–70 weight parts of a coloring agent.

10. The pressure-sensitive adhesive tape or sheet of claim 8 wherein the distance between cross-links is 250–550.

11. The pressure-sensitive adhesive tape or sheet of claim 8 wherein the olefin-based resin comprises 100–30 wt % of polypropylene-based resin with a weight average molecular weight of 80,000–500,000 for which, based on the cross fractionation method, the eluted amount at 0° C. is 30–70 wt % of the total resin amount, the eluted amount at temperatures higher than 0° C. and 70° C. or lower is 5–30 wt % of the total resin amount, and the eluted amount at temperatures higher than 70° C. is 20–60 wt % of the total resin amount, and 0–70 wt % of polypropylene-based resin with a weight average molecular weight of 80,000–500,000 for which, based on the cross fractionation method, the eluted amount at 0° C. is 0–20 wt % of the total resin amount, the eluted amount at temperatures higher than 0° C. and 70° C. or lower is 5–30 wt. % of the total resin amount, and the eluted amount at temperatures higher than 70° C. is 70–90 wt % of the total resin amount.

12. The pressure-sensitive adhesive tape or sheet of claim 11 wherein, at 23° C., the strength at a 2% elongation is 0.40–2.10 Kg/15 mm-width, the breaking elongation is 50% or more, and the residual stress ratio 10 minutes after 10% elongation is 60% or less.

13. The pressure-sensitive adhesive tape or sheet of claim 8 wherein the residual stress ratio 10 minutes after 10% elongation at 23° C. is 60% or less.

14. The pressure-sensitive adhesive tape or sheet of claim 8 wherein, at 5° C. and 35° C., the strength at a 2% elongation is 0.50–2.10 Kg/15 mm-width and the breaking elongation is 70–250%.

15. The pressure-sensitive adhesive tape or sheet of claim 8 wherein the thickness of the urethane resin layer is 5–50 micrometers, the thickness of the olefin-based resin layer is 20–80 micrometers, and the total thickness of the urethane resin layer and the olefin-based resin layer is 25–130 micrometers.

16. A marking tape or sheet comprising the pressure-sensitive adhesive tape or sheet of claim 8.

* * * * *